Feb. 21, 1956 E. E. SEILER 2,735,669
STEP VALVE FOR PRESSURE REGULATION
Filed March 18, 1952 2 Sheets-Sheet 1

INVENTOR.
Ernst E. Seiler
BY
G. J. Kessenich + A. W. Dew
ATTORNEYS

Feb. 21, 1956   E. E. SEILER   2,735,669
STEP VALVE FOR PRESSURE REGULATION
Filed March 18, 1952   2 Sheets-Sheet 2

INVENTOR.
Ernst E. Seiler
BY
G. J. Kessenich & A. W. Dew
ATTORNEYS.

STEP VALVE FOR PRESSURE REGULATION

Ernst E. Seiler, Huntsville, Ala., assignor to the United States of America as represented by the Secretary of the Army Application March 18, 1952, Serial No. 277,310

2 Claims. (Cl. 267—1)

(Granted under Title 35, U. S. Code (1952), sec. 266)

The invention described in the specification and claims may be manufactured and used by or for the Government for governmental purposes without the payment to me of any royalty thereon.

This invention relates generally to valves and more specifically to a pressure regulating valve capable of being adjusted through a considerable range, in small intervals or steps, to achieve a corresponding range of fluid pressure in a conduit on one side of the valve.

The primary object of this invention is to provide a regulating valve which can be set and re-set for any given pressure, within the range of the valve and the equipment concerned, the setting being achieved by reference to a simple scale. The simple character of the scale setting is an important feature of this invention since the scale reading is not ambiguous as it corresponds to the positioning of a simple cam throughout an angular displacement not greater than 360°. Heretofore, most pressure regulator valves have employed a manually set spindle which is threaded or carried by a threaded element for adjustment of spring pressure on a diaphragm. Since such a spindle must be rotated several times to cover the range of the valve, it is difficult to determine the setting thereof without the use of a manometer. Dependable and simple setting means results in a considerable saving of time, especially in such operations as a calibration test where a plurality of fixed pressures have to be used alternately.

Another object of this invention is to provide a regulating valve which is easily set for any desired pressure in the conduit connected to the outlet of the valve, within the range of the device, and also to provide simple automatic locking means to prevent the valve from unwanted creeping toward another setting.

Still another object is to provide a highly efficient mechanism for adjusting spring pressure, a spring biased lever being interposed between a cam and the compression spring and combined in a novel manner in a valve.

A last object to be mentioned specifically is to provide a pressure regulating step valve which is simple and practicable to manufacture, convenient to use, and generally satisfactory and durable in operation.

With these objects definitely in view, this invention resides in the novel construction, arrangement and combination of elements as described in the specification, pointed out in the claims, and illustrated in the drawings, in which:

In the drawings, similar characters of reference indicate similar or identical elements and portions throughout the different views.

Figure 1:
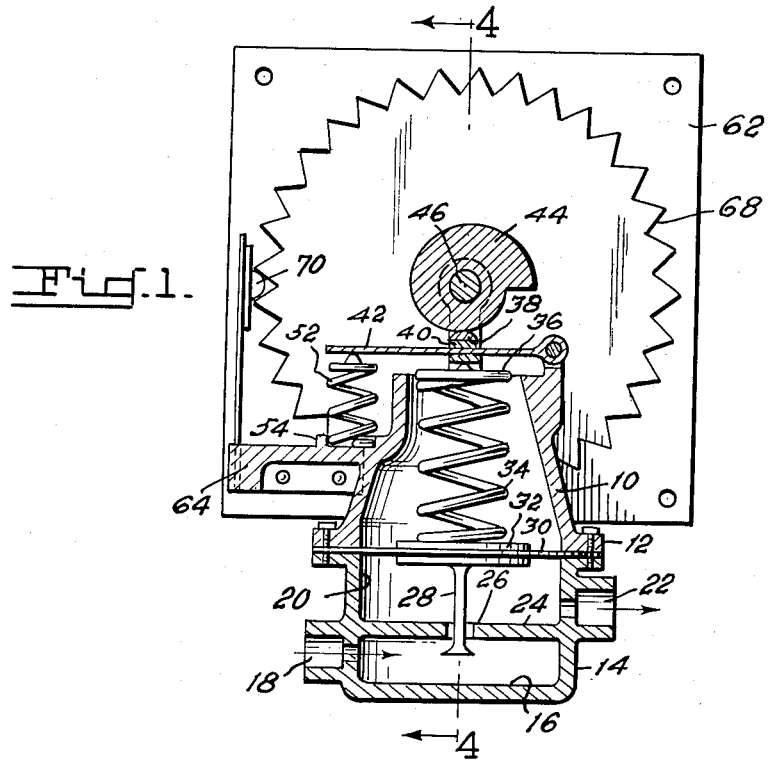
Figure 1 is a vertical sectional view of the pressure regulating valve assembly, taken substantially on the line 1—1 in Figure 3.
Figure 2:
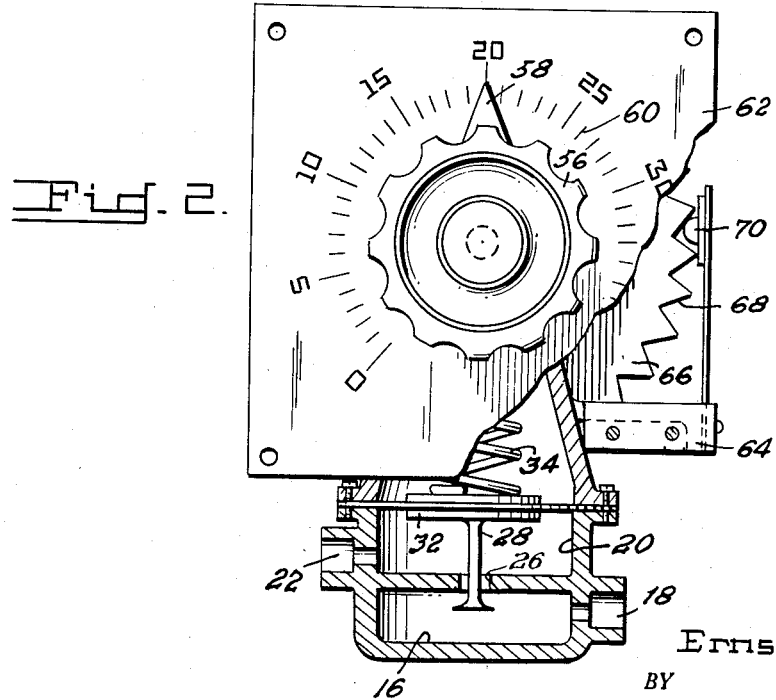
Figure 2 is a front elevational view with portions broken away and the underlying parts shown largely in cross section.
Figure 3:
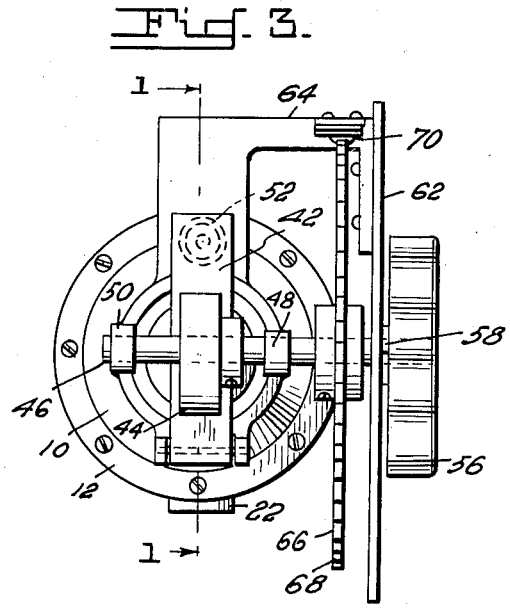
Figure 3 is a top plan view.
Figure 4:
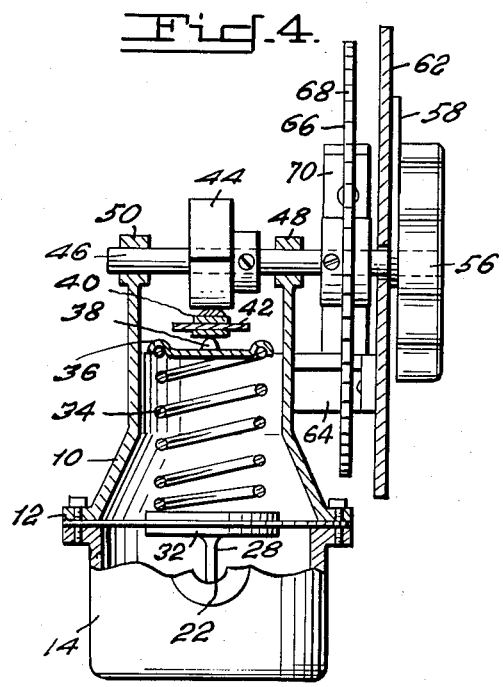
Figure 4 is a transverse vertical section taken substantially on line 4—4 in Figure 1.

A housing 10 is provided with an attachment flange 12 for securement of a dual chambered member 14 having what will be referred to herein as the high pressure chamber 16 with an inlet 18 and a low pressure chamber 20 with an outlet 22. A wall 24 separates these chambers and has an interchamber communicating duct 26 the effective area of which may be varied by a valve 28.

A diaphragm 30 forms an upper wall of the low pressure chamber 20, this diaphragm being marginally secured between the flange 12 and the dual chambered member 14. The valve 28 includes an attachment plate portion 32 mounted upon a central portion of the diaphragm, and a compression spring 34 engaging the side of said attachment plate portion 32 remote from said wall 24, so that the valve will open and close said duct 26 when the diaphragm is strained and flexed in either direction by imbalance of spring pressure and fluid pressure forces acting on the opposite sides of the diaphragm.

A cap 36 is fitted onto the spring 34 and this cap has a pointed contact member 38 engaging a corresponding contact member 40 on a lever 42, the latter being pivoted on the housing 10 and extending over and beyond the compression spring 34. A cam 44 having a single spiral slope operative through the 360° angular movement of the cam engages said contact member 40 in opposition to the compression spring 34, this cam 44 being fixed to an axis member 46 mounted in bearings 48 and 50 provided on the housing 10. A second spring 52 is compressed between its seat 54 on the housing 10 and the end of the lever 42 extending beyond the contact member 40. This second spring 52 stabilizes the lever 42 in position with the contact member 40 engaging the cam 44 and this spring 52 overcomes any friction in the lever mounting. The spring 34 is thereby permitted to serve exclusively the function of pressure regulation in response to changes in pressure.

Setting of the valve to obtain a predetermined pressure is facilitated by a knob 56 having a scalloped edge and this knob is fixed to the axis member 46. A pointer 58 is carried by said knob to facilitate reading a scale 60 on a plate 62 fixed to an offset portion 64 of the housing 10.

For releasably locking the cam in a manually set position, there is provided a cog-wheel 66 fixed to the axis member 46 and having peripheral teeth 68 selectively engageable by a spring biased catch 70 mounted on the offset portion 64. For each fixed or locked position of the cog-wheel 66, corresponding to a position on the cam 44, spring 34 is calibrated so that the spring power corresponds to a certain outlet pressure which is readable on scale 60, and which may be set by turning knob 56.

The operation of this invention will be clear from a consideration of the drawing and the foregoing description, but in recapitulation it may be added that for any given setting, the spring pressure will determine the fluid pressure in the chamber 20, up to the pressure value available in the inlet chamber 16 and within the range of the device. Should the pressure in the chamber 20 subsequently fall below the setting, the spring 34 will push the diaphragm 30 toward the wall 24 and simultaneously shift the valve 28 to increase the effective opening of the duct or orifice 26, thus reducing the pressure differential in chamber 20 relatively to chamber 16 and re-establishing equilibrium. The scale 60 is preferably readable directly in terms of pressure maintained in the chamber 20 for an assumed constant pressure in chamber 16. Alternatively, of course, the scale may indicate the pressure differential between the two chambers.

Obviously minor variation from the disclosed form of this invention may be resorted to, such as variation in the type of scale used, variation in the locking means and vari-

I claim:

1. In a spring urged diaphragm fluid pressure regulator, spring adjustment means comprising, a housing, a diaphragm spring within said housing, a cam rotatably mounted on said housing and adapted to vary the force of said diaphragm spring, a lever pivotally mounted on said housing and having its intermediate portion interposed between said cam and said diaphragm spring, a lever spring mounted on said housing and urging said lever against said cam, said lever spring acting at the free end of said lever to provide a greater moment arm between said lever spring and the cam contact point on said lever than between said point and said pivot, whereby said lever spring overcomes the friction in said pivot independent of said diaphragm spring.

2. In a spring urged diaphragm fluid pressure regulator, spring adjustment means comprising, a housing, a diaphragm spring within said housing, a cam and cam shaft rotatably mounted on said housing and adapted to vary the force of said diaphragm spring, a lever pivotally mounted on said housing and having its intermediate portion flexibly joined to said diaphragm spring to maintain said spring in a position normal to the diaphragm with which it cooperates, resilient means mounted on said housing and engaging said lever at the end thereof remote from said pivot, said resilient means urging said lever against said cam to overcome friction at said pivot independent of said diaphragm spring whereby said spring is not effected by friction at said pivot in making adjustments in the tension thereof.

References Cited in the file of this patent

UNITED STATES PATENTS

| | | |
|---|---|---|
| 324,905 | Westinghouse | Aug. 25, 1885 |
| 1,013,083 | Thomas | Dec. 26, 1911 |
| 1,183,071 | Kaiser | May 16, 1916 |
| 1,324,083 | Tolman | Dec. 9, 1919 |
| 1,530,094 | Ryan | Mar. 17, 1925 |
| 1,773,268 | Jenkins | Aug. 19, 1930 |
| 2,105,876 | Birch | Jan. 18, 1938 |
| 2,200,113 | Horn | May 7, 1940 |
| 2,239,116 | Ray | Apr. 22, 1941 |
| 2,477,720 | Caserta | Aug. 2, 1949 |
| 2,519,448 | Fairchild | Aug. 22, 1950 |